May 7, 1935. F. H. TESCH ET AL 2,000,799
NECKTIE
Filed June 9, 1933
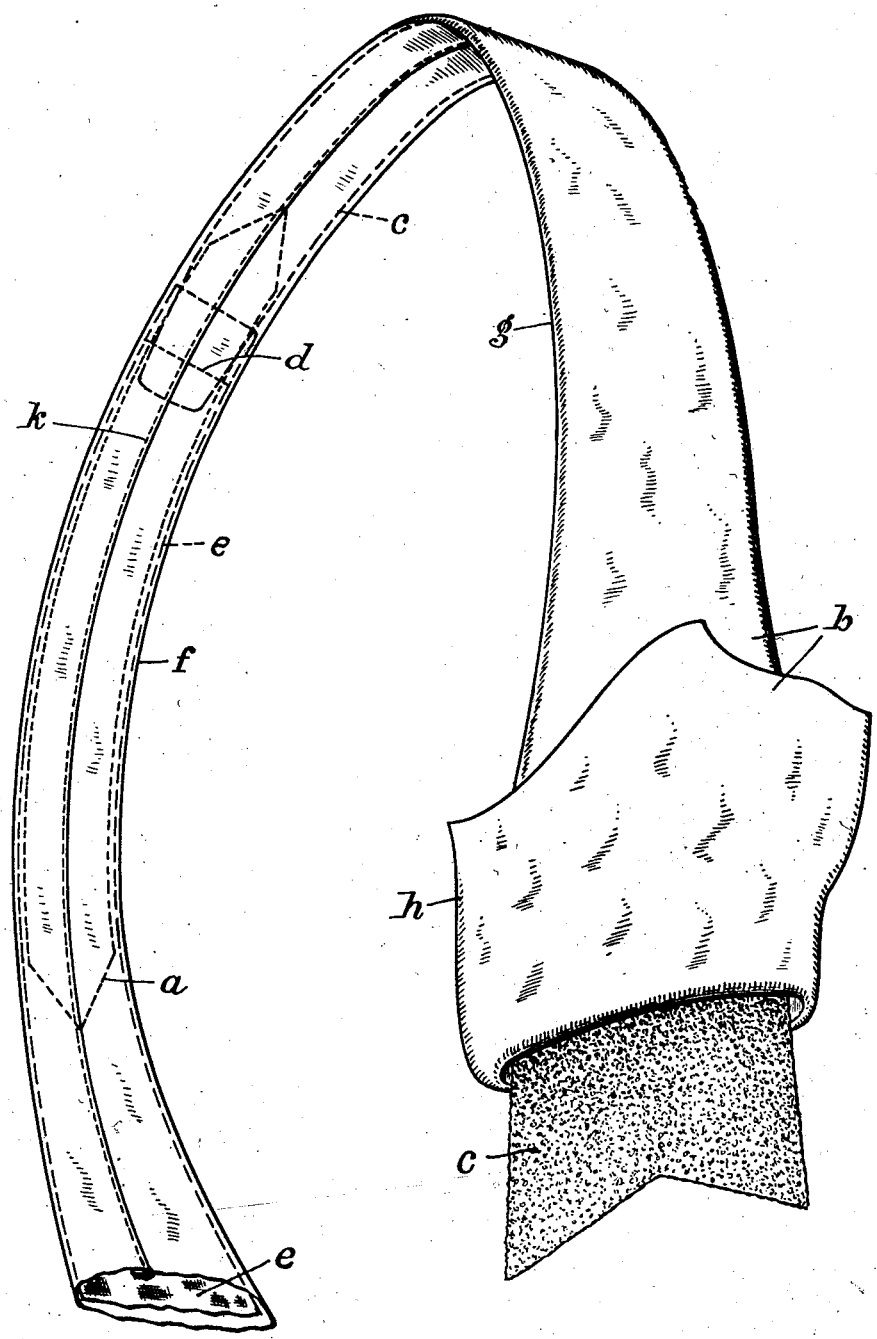
INVENTORS
FRANZ H. TESCH
ELISABETH TESCH
BY
ATTORNEY Patented May 7, 1935

2,000,799

UNITED STATES PATENT OFFICE 2,000,799

NECKTIE

Franz Heinz Tesch and Elisabeth Tesch, Hanover, Germany

Application June 9, 1933, Serial No. 675,060
In Germany December 21, 1932

6 Claims. (Cl. 2—146)

Insertions or linings for bow and four-in-hand neckties consist generally of cloth or similar fibrous material. Such insertions or linings of cloth serve merely as a filling and are incapable of changing or influencing the form of the necktie in any way. The durability of the necktie is determined primarily by the nature of the cloth of which it is made and its mode of weaving. It has already been suggested to employ lining members of a more substantial kind and rubber has already been employed on account of its elastic nature and its peculiar durability. Nevertheless the type of rubber lining members that have been employed suffered from the disadvantage that they gradually stretched and even changed in shape after a certain period of use. It has also been attempted to employ lining members of soft sheet rubber with notches at the edges and in the middle, such lining members being more easily manipulated in the manufacturing process and being more easily sewn to the casing of the necktie. These lining members, of soft solid rubber, however, have not proved satisfactory from all standpoints.

According to the present invention the necktie lining, insert, or filler is made of porous rubber, such as sponge, foam or moss rubber. This porous rubber can be manufactured in still finer sheets than the sheets made of soft rubber. However, for the purpose in question it may be advisable to make the lining members slightly thicker than the lining members of cloth and rubber used hitherto. Porous rubber of still greater thickness can be sewn by the machinery used at present for the manufacture of neckties. The resistance which the needle meets in fine sheets of porous rubber is very small compared with the resistance presented by sheets of soft rubber. Porous rubber of suitable thickness can be sewn with a dry needle whereas it is impossible to work with the needle in soft rubber without the aid of moisture. Furthermore, porous rubber is much better fitted for filling purposes. The porous rubber always keeps the necktie in its original position and returns to its proper position as soon as the necktie is untied. A lining member of porous rubber will not increase in length in ordinary use. As the specific weight of porous rubber is much lower than that of soft rubber, it is advantageous to let the lining member of porous rubber reach to the neck part, where it may be joined with a central lining member of the usual kind, a small ribbon if desired, being stitched on exteriorly of the casing in the customary manner. The central lining member is placed in the neck part proper. The weight of such a necktie changes only very slightly by the replacement of the cloth lining member with the porous rubber lining member in the visible or apron part of the neckties and in the parts which will be knotted. Due to the porous structure of the lining a high degree of friction or suction is created between the same and the casing, preventing the lining from sliding away or lengthening, or the casing of the necktie from moving away from the lining and gathering into folds, for which reason the necktie can be knotted easily and correctly. There will be no folds in the knot of the necktie, as the porous rubber does not curl. The knot fits properly, has a good appearance, and there is no necessity for ironing the necktie, even after it has rendered long service. For the latter reason also cloth of cheaper grades can be employed for the casing in the manufacture of neckties, as the cloth is not worn out, when the necktie is knotted, because the lining, due to its elasticity, absorbs in large part the wear and tear and yet the shape remains unchanged in spite of such elasticity. Necktie casings made of higher grade cloth will last longer if provided with lining members of porous rubber in accordance with the invention.

The lining members of soft, solid or sheet rubber provided with notches etc. will not show all these advantages, as such soft rubber is quite a different product from porous rubber, with regard to manufacture and structure, in spite of the fact that both products come from the same raw material. Even if hollow spaces and notches are provided in the lining members of soft rubber, this material never can be so springy as porous rubber. There is the danger that at these notches the lining members will tear, when the necktie is tightened while being knotted, the necktie being thus made useless. This danger exists for all notches cut in soft rubber after vulcanization. On the other hand it is not useful and too expensive to vulcanize lining members of soft rubber with notches and holes cut prior to the vulcanization, as on account of the limited thickness of the soft rubber more faulty pieces than first class products will result. Owing to the high specific weight of the soft rubber lining member the necktie loosens very easily or slides out of the collar. The use of porous rubber is the only possible solution of the problem of replacing all cloth lining members used hitherto.

A special manufacturing process for the neckties etc. with lining members of porous rubber shows clearly the great advantage of the members in question. As indicated on the accompanying drawing, which shows by way of example a necktie construction according to the invention, there is preferably retained the known central lining member $e$ of suitable material in the form used hitherto and occupying the neckband portion $f$ of the casing $b$. The lining $e$ is joined at $d$ by sewing, stitching, etc. with the lining member of porous rubber $c$. The combined neckband lining which may include the uppermost portion of the porous rubber lining $c$ as shown on the drawing, is attached to the casing $d$ by the stitching $a$.

The necktie may be assembled in the following manner: The linings $c$ and $e$ are connected by the stitching $d$ and the casing is then folded longitudinally with the face side inward and with its free edges in slightly overlapping relation at approximately the longitudinal center of such casing. The lining, made up of the two members as above described, is placed over the overlapping edges of the casing in such a manner that a row of stitches $k$ along approximately the center line of the lining simultaneously connects such lining and the two edges of the casing. The tie is then turned right side out to the position shown on the drawing. If desired, a ribbon may then be placed exteriorly upon the inner face of the neckband portion $f$ and secured in place with the aid of the stitching $a$.

As already indicated, the porous rubber lining may extend into the neckband portion $f$ of the casing, but should in any event occupy the knot-forming portion $g$ of the necktie; preferably, it should extend also into the visible or apron portion $h$ of the casing. The junction of the lining member with the necktie casing is so firm, that a sliding movement is impossible. The difference in weight of the different lining members makes the necktie very satisfactory, as by the higher weight of the lining member of porous rubber the cloth of the necktie keeps its position and has a uniform and pleasing appearance. A further advantage is the fact that the necktie remains springy, which feature is not shown by any of the neckties now on the market.

We claim:

1. A necktie having a lining of porous rubber having a rough exterior surface and positioned at least in the knot-forming portion of the tie.

2. A necktie having a lining of porous rubber presenting a rough exterior surface and sewn along a median line to the rear portion of the casing of the necktie.

3. A necktie having a lining in the neck portion thereof and a lining of porous rubber in the knot and visible portion thereof, said rubber lining presenting a rough exterior surface and being connected with said first mentioned lining.

4. A necktie comprising a casing of cloth and a lining of porous rubber of relatively large bulk and low specific weight and presenting a rough exterior surface, said rubber lining being stitched to the casing and said necktie possessing considerable resilience longitudinally thereof.

5. A four-in-hand necktie comprising a casing and a lining member of porous rubber having a rough exterior surface and positioned in at least the knot-forming portion of the necktie.

6. A four-in-hand necktie comprising a casing and a lining of porous rubber presenting a rough exterior surface and stitched to the rear face of the casing, said lining extending through the knot-forming portion and through at least part of the apron portion of the necktie.

FRANZ HEINZ TESCH.
ELISABETH TESCH.